United States Patent [19]
Adams et al.

[11] Patent Number: 5,108,815
[45] Date of Patent: Apr. 28, 1992

[54] EMBOSSED DUCT TAPES

[75] Inventors: Charles L. Adams; Kenneth D. Herndon, both of Franklin; David R. Witty, Bowling Green, all of Ky.; Rajiv Anand, Nashville, Tenn.

[73] Assignee: The Kendall Company, Mansfield, Mass.

[21] Appl. No.: 577,717

[22] Filed: Sep. 5, 1990

Related U.S. Application Data

[63] Continuation of Ser. No. 225,335, Jul. 28, 1988, abandoned.

[51] Int. Cl.⁵ ................................................ B32B 3/00
[52] U.S. Cl. .................................... 428/172; 428/213; 428/214; 428/215; 428/245; 428/246; 428/250; 428/261; 428/263; 428/265; 428/272; 428/289; 428/355; 428/356

[58] Field of Search ............... 428/156, 172, 265, 272, 428/167, 354, 246, 250, 906, 245, 355, 356, 119, 120, 131, 141, 137, 194, 213, 212, 214, 215, 261, 263, 289, 492

[56] References Cited

U.S. PATENT DOCUMENTS

| | | | |
|---|---|---|---|
| 3,962,508 | 9/1976 | Nakanose | 428/169 |
| 4,237,889 | 12/1980 | Gobran | 428/167 |
| 4,303,724 | 12/1981 | Sergeant | 428/229 |
| 4,581,087 | 4/1986 | Johnson | 428/43 |
| 4,612,230 | 9/1986 | Liland | 428/167 |
| 4,775,572 | 10/1988 | Buber et al. | 428/163 |
| 4,781,957 | 11/1988 | Brown et al. | 428/43 |

*Primary Examiner*—Ellis P. Robinson
*Assistant Examiner*—Donald J. Loney
*Attorney, Agent, or Firm*—M. Maus

[57] ABSTRACT

Novel duct tapes comprising a water-impermeable sheet backing carrying, in order, a cloth material and an adhesive layer, wherein the backing is embossed in order to lower the density and thereby render a duct tape of a given thickness more cost-effective.

6 Claims, No Drawings

EMBOSSED DUCT TAPES

This application is a continuation of application Ser. No. 225,335, filed Jul. 28, 1988 now abandoned, in the name of Charles Lee Adams.

BACKGROUND OF THE INVENTION

The present invention is directed to adhesive tapes and, more particularly, to providing duct tapes having a lower density and which are consequently more cost-effective to manufacture.

In its simplest form, duct tapes comprise a cloth material carrying an adhesive layer on one surface thereof. While in theory, the adhesive coating could comprise any of the per se known heat—or water-activated adhesives, for ease of application by the user they will usually be one of the known pressure-sensitive adhesives. Useful adhesives for this purpose include acrylic or rubber-based adhesive formulations.

The cloth material employed will preferably be a woven web for ease of tearability in the cross-direction (CD), as distinguished from non-wovens which, due to their primary orientation in the machine direction (MD) are not readily tearable in the CD.

For flexibility as well as the ability to manufacture the tape in roll form, the cloth ordinarily should not have a dense thread count. Consequently, with the woven cloths of lesser thread count density which are employed, the adhesive layer will tend to flow through the cloth, making the resulting product commercially unacceptable.

For this reason, commercially available duct tapes have an outer water-impermeable, flexible plastic laminated to the cloth layer. Since the cloth layer provides reinforcement and increased tensile strength and the backing is of sufficient thickness, e.g. 1-4 mils to provide the requisite dimensional stability, the known duct tapes of this description are characterized as being both strong and flexible.

Manufacturers of these duct tapes are constantly seeking ways to lower the cost of manufacture in order to produce a lower cost duct tape in this highly competitive industry.

A logical way to attempt to do so would be to employ less expensive materials, i.e. less expensive backing materials, cloths and/or adhesives. However, minimal cost savings are obtainable in this manner without sacrificing the qualities of strength, flexibility, and adhesive properties required for the contemplated uses of duct tapes.

Another more viable method of reducing cost is to reduce the density of the tape, namely to reduce the amount of material employed in the manufacture of the tape.

Since the adhesive layer must generally be of a given thickness, e.g. on the order of 1-4 miles to achieve the required adhesive properties for duct tapes and the cloth material is of a given thickness, e.g. 6-10 mils to provide the desired increased tensile strength, in accordance with the present invention efforts to reduce the density were directed to the backing layer itself the major cost item in the current manufacture of duct tapes.

A method of lowering the density of duct tape backings is described and claimed in U.S. Pat. No. 4,705,715 issued to DeCoste and Mamish and assigned to the instant assignee. In accordance with the patented invention the backing for the reinforcing cloth and adhesive layer comprises a layer of plastic foam having a thin plastic skin adhered to the outer surface.

Another way of reducing the material in the backing is to incorporate glass or other such microspheres into said backing.

The present invention is directed to another means of lowering the density of the backing which is easy to manufacture, does not require the use of other materials, e.g. foaming agents, microspheres and the like, and further provides improved adhesive to backing adhesion.

BRIEF DESCRIPTION OF THE INVENTION

In accordance with the present invention, the aforementioned task is solved in a simple and elegant manner by embossing the backing material so as to increase its thickness over that obtainable from a conventional planar backing; thereby obtaining the structural stability of a thicker material while decreasing the amount of polymer needed to product a thicker material.

In addition to decreasing the density or amount of polymer employed to produce the backing, it has additionally been found, quite unexpectedly, that a significant increase in adhesion to backing is obtained.

DETAILED DESCRIPTION OF THE INVENTION

As was heretofore mentioned, the present invention is directed to adhesive tapes of the well known type having a reinforcing cloth material or scrim sandwiched between the backing sheet material and an adhesive layer, the essence of the invention being embossed the backing sheet material so as to increase the thickness obtainable from a given amount of polymer and thereby produce a more cost effective tape.

The particular materials which may be employed in preparing the tape are conventional and per se comprise no part of this invention.

For example, the backing material may comprise any of the per se known flexible plastic support material heretofore used for such purposes, e.g. a cellulose ester such as cellulose acetate, cellulose triacetate, and the like; a polyester such as polyethylene terephthalate; or a polyolefin such as polyethylene or polypropylene, the polyolefins being particularly useful backing materials. Most preferred are the polyethylenes, e.g. low density-, high density-, or linear low density polyethylene, including mixtures thereof. As is known, the backing sheet may contain other materials performing specific desired functions, e.g. a colorant such as carbon black, a flame retardant, e.g. a brominated aromatic amide such as ethylene bis-tetrabromophthalamide or a chlorinated cycloaliphacic flame retardant, and the like.

The cloth will preferably comprise a woven material made of natural fibers such as cotton or wool, synthetic fibers such as polyester, or mixtures of such fibers. U.S. Pat. No. 4,303,724 issued to Sergeant and Thomas and assigned to The Kendall Company, assignee of the present invention, described and claims particularly efficacious cloth materials and adhesive tapes employing them. As disclosed therein, the tear characteristics in the cross direction of such tapes having low-count reinforcing fabrics is greatly improved if the fabric comprises texturized or "false-twist" yarns in the filling direction. For instance, in the specific embodiment of the invention in Col. 3, a gauze fabric was constructed using 20 yarns per inch of cotton in the warp (machine direction) and 12 false twist polyester yarns in the filling (cross) direction. When torn by hand, the tear properties of the tape imparted by the 20×12 fabric achieved an even tear previously attainable only by the use of appreciably higher count fabrics.

The adhesive layer will preferably comprise a pressure-sensitive rubber-based adhesive. As is known and understood in the art, rubber-based adhesives will comprise at least one rubbery elastomer and at least one tackifying resin along with other additives performing specific desired functions, e.g. a colorant, fillers, antioxidants, etc.

The elastomers employed in such adhesives may be defined as being polymeric materials having rubber-like properties. Examples of such materials include natural rubber, cyclized rubber, styrene-butagiene copolymer (SBR), acrylontirile-butadiene copolymer (NBR), chlorinated rubber polychloroprene (neoprene) rubber hydrochloride, polysulfide rubber, carboxylic elastomers, silicone rubber, polyurethane rubber, acrylonitrile-butadiene-styrene (ABS), reclaimed rubber, butyl rubber, polyisoprene, polyisobutylene, ehtylene-propylenediene monomer terpolymer rubber (EPDM), the "Kraton" (trademark of Shell Chemical) family of rubbery polymers, etc.

In preparing the novel tapes of this invention, the backing sheet may be embossed by per se known techniques such as stamping. A particularly useful method known in the art utilizes an embossing roll.

As is understood by those skilled in the art, an embossing roll comprises a metal roll such as steel which is engraved to provide a number of pins or projections in a desired pattern, which pattern may for example comprise rows of equally spaced projections. Alternatively, other patterns, e.g. diamond-shaped projections at spaced intervals may be provided. The projections or pins may, for example, extend on the order of 0.75 mil or higher above the place of the roll. Following roll engraving to provide the desired pattern, the embossing roll may then be chromeplated.

As will be appreciated, embossing rolls may come in varying sizes. By way of illustration, such a roll may have a nine foot (108") face and a 23¾" diameter. In accordance with this invention, it may have on the order of 100–600 pins per square inch, although greater or lesser amounts of the embossing pins are also contemplated.

In operation, the embossing roll is used in combination with a smooth flexible pressure roll of rubber or other suitable material maintained under pressure at a zero gap. In this manner, when one of the rolls is caused to rotate by suitable drive means, the frictional force exerted by the zero gap causes the other to turn.

To prepare an embossed film utilizing the above described technique, a falling curtain of molten polymer extruded through a die may be provided at the nip of the superposed rolls. The pins from the embossing roll pressing against the contiguous surface of the polymer film causes embossed areas to be provided on the opposed surface, which embossed surface is pressed against the smooth rubber roll. The resulting embossed film is then taken up on a wind-up roll for the next step of the tape manufacture.

The height of the embossed areas can be kept constant by maintaining a constant pressure retaining the respective rolls in superposition. By increasing the pressure, the embossed areas are in turn heightened (to the extent permitted by the height of the pins) so that it can be said that the increased thickness, as measured from the tips of the embossed areas to the planar surface of the opposed surface of the film, is in part dependent upon the height of the embossing pins and is in part dependent upon the applied pressure against the rolls.

The thickness of the film, as measured from one planar surface to the other planar surface, may be varied in accordance with the respective speeds of the line (tape-up) speed and the feed (extruder) speed. Thus, for example, by maintaining a constant pressure and line speed, while varying the extruder speed, the planar thickness may in turn by varied while maintaining the same weight (or depth, depending on how it is viewed) of embossing. In general, increasing the extruder speed will increase the thickness. Conversely, the planar thickness may be varied by maintaining a constant extruder speed and varying the line speed, in which event increasing the line speed will result in a thinner planar thickness.

Following preparation of the embossed backing sheet in the aforementioned manner, the cloth intermediate layer and the adhesive outer layer of the duct tape assembly may be provided in known manner.

While this can be done in individual steps wherein the cloth is first laminated to the non-embossed surface of the backing by a thin layer of a suitable adhesive and then the so-called "user" adhesive of the tape is thereafter applied to the free outer surface of the cloth, in known manner this is preferably done in a single step utilizing a 3-roll calender wherein the first roll is heated to a first elevated temperature, e.g. 270° F., the middle roll is heated to a second elevated temperature below that of the first roll, e.g. 185° F. and the third roll is heated to a third temperature above that of the middle roll, e.g. 330° F. As is known, in utilizing a 3-roll mill of this type, the adhesive will adhere to the cooler of the superposed rolls where it is applied.

Thus, for example, such a 3-roll calender is set up so that a web of the embossed backing from a feed roll is passed along the outer surface of the third roll; a web of cloth from a feed roll is passed between the middle and third rolls; a mass of adhesive is provided at the nip of the first and second rolls; and a second mass of adhesive is provided at the nip of the middle and third rolls so as to contact the side of the cloth contiguous to the third roll.

In operation, the first-mentioned mass of adhesive adheres to the cooler middle roll and is applied to the surface of the cloth contiguous to the middle roll. As the rolls then turn, it can be said that the cloth is then sandwiched between two adhesive layers which may be of the same composition or different but which, as will be detailed hereinafter are preferably of different thicknesses. As the rolls then continue to turn so that the adhesive-coated cloth is brought into superposition with the non-embossed side of the backing material, the cloth is then adhered to the backing through the adhesive layer on that surface of the cloth. The resulting laminar structure may then be described as comprising the embossed backing carrying, on the non-embossed surface thereof, in order, a first adhesive layer, the cloth, and a second or "user" adhesive layer.

In so stating, it will be appreciated that the respective adhesive layers are not discrete or linear, as viewed in a photomicrograph, since a portion of the adhesive will penetrate the interstices or porous structure of the cloth.

As previously stated, it is preferred that the second or user adhesive comprise a layer of a tacky pressure-sensitive adhesive. e.g. a rubber-based adhesive of the foregoing description. However, while the first adhesive layer bonding the cloth to the backing is also preferably rubber-based, it need not be tacky but only need provide a good cloth to backing bond.

In this context, the embossed nature of the backing sheet has been found, quite unexpectedly, to provide a significant increase in the adhesion backing. While not wishing to be limited to any particular theory, it is believed this increased adhesive strength is caused by the adhesive flowing into the ridged surface created by the embossed pattern, getting "trapped" therein and thus forming a locked-in adhesion.

As previously stated, the adhesive layers are preferably of different thicknesses. The first adhesive layer need only be relatively thin, e.g. on the order of 1-2 mils in order to bond the cloth to the backing. However, the second or user adhesive on the inner surface of the tape should preferably be thicker.

The two adhesives, if different, will be selected so as to be compatible in the sense of providing a good adhesive to adhesive bond so that the second adhesive layer will in part penetrate through the cloth to bond to the first adhesive layer, thereby increasing the structural stability of the laminar tape assembly.

By way of recapitulation, the novel adhesive tapes of this invention will preferably comprise an embossed water-impermeable flexible plastic sheet material carrying on the non-embossed surface thereof, in order:

(1) a laminating adhesive layer;
(2) a reinforcing cloth material; and
(3) an outer pressure-sensitive adhesive layer.

The plastic sheet material (referred to herein as the "backing" is preferably polyethylene and may be on the order of 1-4 mils thick with thicknesses on the order of 1.2-2.5 mils being most preferred. The embossed projections from the planar surface may be on the order of 0.3-1.0 mil or greater and in general on the order of 100-250 of these projections per square inch of surface area will be provided.

The laminating adhesive layer, which is preferably rubber-based, but need not be a pressure-sensitive adhesive, may be on the order of 1-3 mils thick. The cloth will most preferably be a woven cloth made of natural and/or synthetic fibers for ease of tearability in the cross direction. The cloth may be on the order of 6-10 mils to provide optimum reinforcement and increased tensile strength for most contemplated uses. However, greater or lesser thicknesses may be employed and still have a useful product in accordance with this invention. It may, for example, be a 20×14 cotton/polyester fabric prepared in accordance with the aforementioned U.S. Pat. No. 4,303,724, a 42×28 woven cotton, etc.

The outer adhesive layer (referred to herein as the "user" adhesive) may be on the order of 1-4 mils thick, most preferably on the order of 1.5-2.0 mils thick and, as previously discussed, will preferably be a pressure-sensitive rubber-based adhesive of the type heretofore known and used in commercially available industrial tapes, e.g. industrial tapes manufactured and sold by The Kendall Company, assignee of the present invention. These adhesives, the selection of which is a matter of individual choice and per se comprises no part of this invention, will in general comprise one or more rubbery elastomers, one or more tackifying resins, filler and other reagents such as a colorant (according to the desired color for the backing), antioxidant, etc. Since these adhesives are so well known in the art, they need not be described in further detail.

While rubber-based adhesives are preferred, it is to be expressly understood, however, that the invention is not limited thereto and acrylic adhesives, e.g. a terpolymer of acrylic acid, an acrylate and an acetic acid ester are also contemplated.

In the foregoing discussion, mention was made of the sequential manufacturing steps wherein the embossed backing was first coated with the laminating adhesive and thereafter the cloth and user adhesive were provided.

While the invention is primarily directed to adhesive tapes including a reinforcing cloth material, it is to be noted that a tape comprising the embossed backing carrying only the laminating adhesive and thereafter the cloth and user adhesive were provided.

While the invention is primarily directed to adhesive tapes including a reinforcing cloth material, it is to be noted that a tape comprising the embossed backing carrying only the laminating adhesive finds utility both as an intermediate in the preparation of the recited duct tapes or as a commercial adhesive itself wherein the "laminating" adhesive then becomes the "user" adhesive.

The following examples show by way of illustration and not by way of limitation the practice of this invention.

EXAMPLE 1

A molten mixture comprising about 97.5 percent by total weight of low density polyethylene (LDPE) and about 2.5 percent by total weight of aluminum flakes as a silver colorant was extruded at a speed of about 132 rpm through a die into the nip of an embossing roll/rubber roll device as previously described. The embossing roll had approximately 200 pins per square inch. The pressure was set at 25 pounds per square inch and the line speed at 200 feet per minute. The resulting film taken up on the wind-up roll was characterized as having a thickness as measured between the planar surfaces of about 1.8 mils and a thickness as measured from the embossed projections on one surface to the planar opposed surface of about 2.2. mils, thereby providing an apparent increase in thickness of about 1.8 mils.

EXAMPLE 2

The embossed film prepared in Example 1 was subjected to a Corona treatment on the side to be coated and was then employed to make a duct tape in the heretofore described manner on a 3-roll calender. The surface temperature of the respective rolls were set by internal heating to be 270° F. for the top roll, 185° F. for the middle roll and 330° F. for the bottom roll. The line speed, as determined by the middle roll, was set at 65 yards per minute. A woven 20×14 cotton/polyester 8 mil cloth was employed and in the described manner the duct tape was formed. The adhesives for each of the adhesive layers was a commercial rubber-based adhesive as previously described. The laminating adhesive was calendered to provide a layer approximately 1.5 mils thick; while the user adhesive layer was approximately 2.0 mils thick. The resulting tape may then be slit into desired widths in a known manner.

When wound on itself, as in the contemplated usages wherein a tape is spirally wound over an object, the adhesive was found to adhere extremely aggressively to the embossed outer surface of the backing, as previously alluded to.

Since certain changes may be made without departing from the scope of the invention as herein described, it is intended that all matter contained the foregoing description, including the examples, shall be taken as illustrative and not in a limiting sense.

What is claimed is:

1. In an adhesive tape comprising a backing material carrying on one surface thereof, in order, a reinforcing cloth material tearable in the cross direction and adhesive layer, said cloth laminated to said backing through an intermediate adhesive layer one surface of which is adhered to said backing, the opposed surface of said adhesive layer being bonded to said cloth;

the improvement wherein the free outer surface of said backing material is embossed with from about 100 to about 600 embossed projections per square inch of surface area rising form about 0.3 to about 1.0 mil above the planar surface of said backing material.

2. An adhesive tape as defined in claim 1 wherein said adhesive layer comprises a rubber-based pressure sensitive adhesive.

3. An adhesive tape as defined in claim 1 wherein said cloth material comprises a woven cloth containing fibers selected from the group consisting of natural fibers, synthetic fibers and mixtures of natural and synthetic fibers.

4. An adhesive tape as defined in claim 1 wherein at least a portion of said first mentioned adhesive layer permeates the interstices of said cloth and is adhered to said intermediate adhesive layer.

5. An adhesive tape comprising a flexible water-impermeable backing sheet material one surface of which is embossed, said backing sheet material being from about 1 to about 4 mils thick as measured from the embossed projections to the planar surface on the opposed side of said sheet material; said backing sheet material carrying on said opposed side, in order, a rubber-based adhesive layer from about 1 to about 3 mils thick; a porous woven cloth from about 6 to 10 mils thick; and an inner rubber-based pressure sensitive adhesive layer from about 1 to about 4 mils thick, wherein said embossed surface contains from about 100 to about 600 embossed projections per square inch of surface area.

6. An adhesive tape as defined in claim 5 wherein said embossed projections are from about 0.3 to about 1.0 mil above the planar surface of said backing material.

* * * * *